United States Patent
Cvejanovic et al.

(10) Patent No.: US 11,486,745 B2
(45) Date of Patent: Nov. 1, 2022

(54) METHOD FOR PROVIDING SENSOR DATA OF A SENSOR, AND SENSOR SYSTEM

(71) Applicant: Robert Bosch GmbH, Stuttgart (DE)

(72) Inventors: Dorde Cvejanovic, Munich (DE); Jan Hayek, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/047,183

(22) PCT Filed: Jun. 22, 2019

(86) PCT No.: PCT/EP2019/066565
§ 371 (c)(1),
(2) Date: Oct. 13, 2020

(87) PCT Pub. No.: WO2020/043344
PCT Pub. Date: Mar. 5, 2020

(65) Prior Publication Data
US 2021/0223072 A1    Jul. 22, 2021

(30) Foreign Application Priority Data

Aug. 29, 2018  (DE) .................. 102018214600.4

(51) Int. Cl.
*G01D 21/00*  (2006.01)
(52) U.S. Cl.
CPC ..................... *G01D 21/00* (2013.01)
(58) Field of Classification Search
CPC ..................................... G01D 21/00
See application file for complete search history.

(56) References Cited

U.S. PATENT DOCUMENTS

| 10,949,317 B2* | 3/2021 | Hayek ............... G06F 11/3476 |
| 2011/0257936 A1* | 10/2011 | Kulik .................. G01D 3/024 |
| | | 702/189 |
| 2019/0242730 A1* | 8/2019 | Croke ................ G01D 21/00 |

FOREIGN PATENT DOCUMENTS

| DE | 102015209288 A1 | 12/2015 |
| EP | 2851653 A1 | 3/2015 |
| EP | 3413073 A1 | 12/2018 |

OTHER PUBLICATIONS

International Search Report for PCT/EP2019/066565, dated Sep. 27, 2019.

* cited by examiner

*Primary Examiner* — Mischita L Henson
(74) *Attorney, Agent, or Firm* — Norton Rose Fulbright US LLP; Gerard A. Messina

(57) ABSTRACT

A method for providing sensor data, including providing a maximum measuring range for the sensor, providing a first measuring range which is within the maximum measuring range, providing the sensor data in a data structure having a size that corresponds to the first measuring range, providing a second measuring range which is different from the first measuring range and is within the maximum measuring range, adapting the provided sensor data of the first measuring range for the second measuring range so that the adapted sensor data are provided in an expanded data structure having a size that corresponds to the maximum measuring range, and the provided sensor data being arranged as a function of the difference of the size between the maximum and the second measuring range and the size of the second measuring range within the expanded data structure, and the sensor-data-free sections being filled with values.

10 Claims, 3 Drawing Sheets

METHOD FOR PROVIDING SENSOR DATA OF A SENSOR, AND SENSOR SYSTEM

FIELD

The present invention relates to a method for providing sensor data of a sensor.

The present invention further relates to a sensor system.

The present invention further relates to a method for manufacturing a sensor system.

Although the present invention is applicable in general to any arbitrary sensors, the present invention is described with regard to acceleration sensors.

BACKGROUND INFORMATION

Conventional sensor systems, for example acceleration sensors, rotation rate sensors, pressure sensors or the like, may provide the possibility of expanding their measuring range at the expense of accuracy. For example, an acceleration sensor may offer the following measuring ranges: 2 g, 4 g, 8 g and 16 g or a rotation rate sensor may offer the following measuring ranges to choose from: 2,000 degrees/s, 1,000 degrees/s, 500 degrees/s, 250 degrees/s, or 125 degrees/s. The change in the measuring range effectuates a change in the configuration of the analog and/or digital filters of the sensor system. Depending on the measuring range, the output sensor data are to be interpreted differently: A provided acceleration sensor value of 0×4,000, for example, means a measurement of 4 g in a measuring range of 8 g, but it means 1 g in a measuring range of 2 g. Depending on the adjusted measuring range, the sensor data must then be adapted, appropriate algorithms being provided in the sensor system for this purpose.

SUMMARY

In one specific embodiment, the present invention provides an example method for providing sensor data of a sensor, including the steps:

providing a maximum measuring range for the sensor,
providing a first measuring range for the sensor, which is within the maximum measuring range,
providing the sensor data in a data structure, the data structure having a size that corresponds to the first measuring range,
providing a second measuring range for the sensor, which is different from the first measuring range and is within the maximum measuring range,
adapting the provided sensor data of the first measuring range for the second measuring range in such a way that the adapted sensor data are provided in an expanded data structure, the expanded data structure having a size that corresponds to the maximum measuring range, and the provided sensor data being arranged as a function of the difference of the size between the maximum and the second measuring range and the size of the second measuring range within the expanded data structure, and the sensor-data-free sections being filled with values.

In another specific embodiment, the present invention provides an example sensor system having a maximum measuring range, including a sensor having a first measuring range that is within the maximum measuring range, the sensor being designed to provide sensor data in a data structure, the data structure having a size that corresponds to the first measuring range and an adaptation device for adapting the provided sensor data of the first measuring range for a second measuring range, which is different from the first measuring range and is within the maximum measuring range, in such a way that the adapted sensor data are provided in an expanded data structure, the expanded data structure having a size that corresponds to the maximum measuring range, and the provided sensor data being arranged as a function of the difference of the size between the maximum and the second measuring range and the size of the second measuring range within the expanded data structure, and the sensor-data-free sections being filled with values.

In another specific embodiment, the present invention provides an example method for manufacturing a sensor system, including the steps:

manufacturing a sensor having a first measuring range that is within the maximum measuring range, the sensor being designed to provide sensor data in a data structure, the data structure having a size that corresponds to the first measuring range, and
manufacturing an adaptation device for adapting the provided sensor data of the first measuring range for a second measuring range, which is different from the first measuring range and is within the maximum measuring range, in such a way that the adapted sensor data are provided in an expanded data structure, the expanded data structure having a size that corresponds to the maximum measuring range, and the provided sensor data being arranged as a function of the difference of the size between the maximum and the second measuring range and the size of the second measuring range within the expanded data structure, and the sensor-data-free sections being filled with values.

One of the advantages of the example embodiments of the present invention is that, on the one hand, it is no longer necessary to post-process the sensor data according to the adjusted measuring range. On the other hand, different algorithms do not have to be provided, so that needed storage space in the sensor or sensor system may be reduced. At the same time, the flexibility is increased, since future measuring range expansions may already be taken into account when manufacturing the sensor, so that an expansion may be provided more easily at a later point in time.

Further features, advantages, and further specific embodiments of the present invention are described below or provided as a result thereof.

According to one advantageous refinement of the present invention, the example sensor data are sequentially stored in the expanded data structure, which is designed one-dimensionally, one after another in such a way that the sensor-data-free sections are arranged at the beginning of the expanded data structure and/or at the end of the expanded data structure.

This allows for the measuring range to be readily expanded and the adapted sensor data to be further processed based on the expanded data structure with the aid of appropriate evaluation devices connected downstream.

According to another advantageous refinement of the present invention, the size of the sensor-data-free section at the beginning of the expanded data structure is reduced in the case of a greater measuring range, starting from the first measuring range, and the size of the sensor-data-free section at the end of the expanded data structure is increased according to the size of the reduction. In other words, the provided sensor data are thus shifted within the expanded data structure from smaller to greater measuring ranges, thus allowing for the sensor data to be readily adapted for different measuring ranges for the purpose of further processing.

According to another advantageous refinement of the present invention, the values are provided as signs and/or as the value "0." The sensor-data-free sections are thus easily completed in the expanded data structure.

According to another advantageous refinement of the present invention, the values are provided as random data. This makes it possible, in particular, to implement the filtering processes more easily in the case of filtering processes that are to be applied to the adapted data.

According to another advantageous refinement of the present invention, the expanded data structure is provided with an MSB 0 bit numbering. This makes it possible to easily further process the adapted sensor data.

According to another advantageous refinement of the example sensor system of the present invention, the adaptation device includes a microcontroller. This makes a reliable and fast adaptation of the provided sensor data possible.

According to another advantageous refinement of the example sensor system of the present invention, the sensor and the adaptation device form a structural unit. In this way, the installation space of the sensor system is reduced overall.

According to another advantageous refinement of the example sensor system of the present invention, the sensor and the adaptation device are structurally separated, but connected to one another, preferably via a wireless connection. The flexibility with regard to situating the sensor and the adaptation device is thus increased.

Further features and advantages of the present invention result from the description herein and from the figures.

It is understood that the above-mentioned features and the features to be elucidated below are usable not only in the given combination, but also in other combinations or alone without departing from the scope of the present invention.

Preferred embodiments and specific embodiments of the present invention are illustrated in the figures and are elucidated in greater detail in the description below, identical reference numerals referring to identical or similar or functionally identical components or elements.

DETAILED DESCRIPTION OF EXAMPLE EMBODIMENTS

Figure 1:
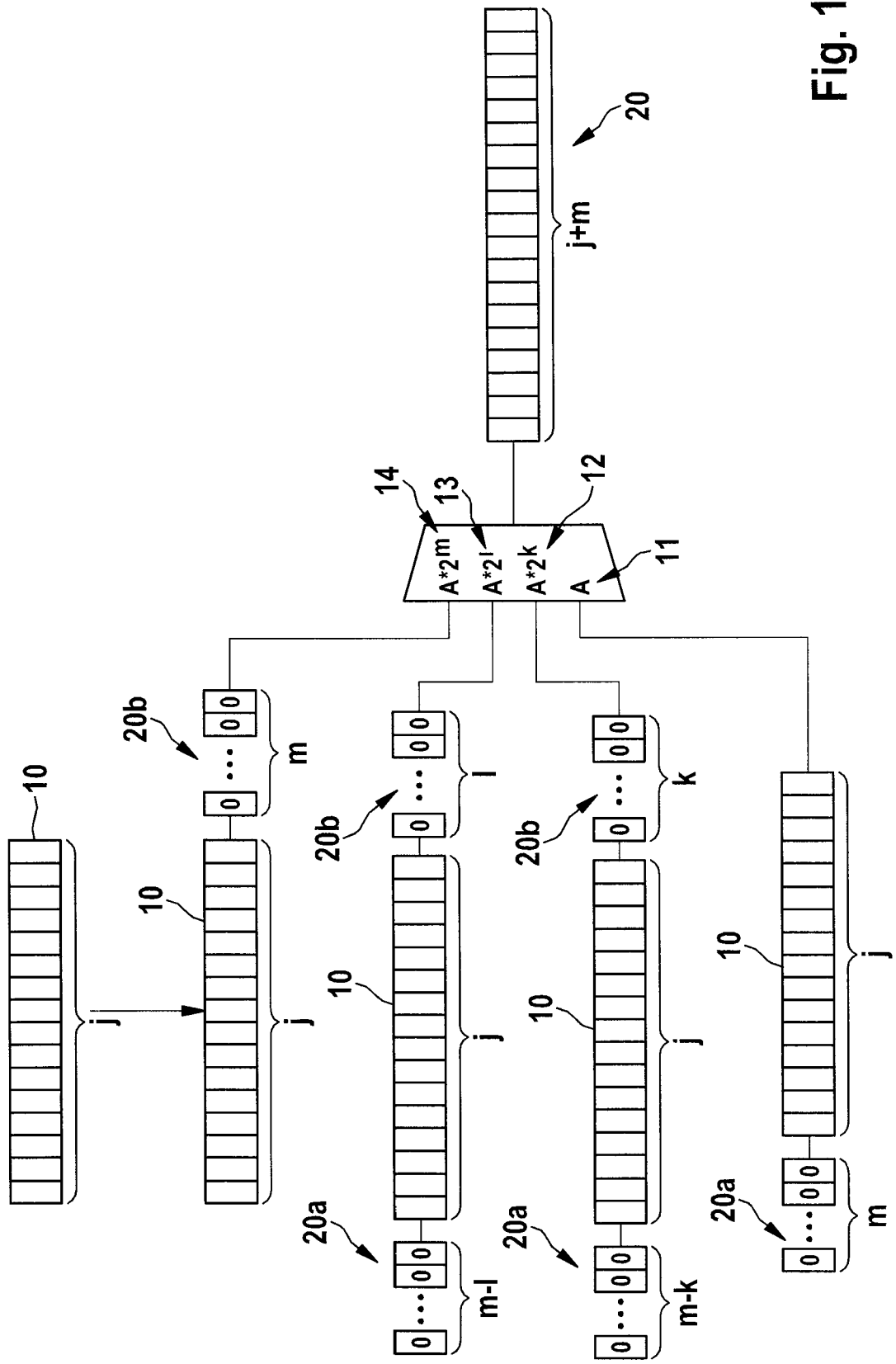
FIG. 1 schematically shows different arrangements of sensor data within one data structure for different measuring ranges of a sensor according to specific example embodiments of the present invention.

FIG. 1 shows different arrangements of sensor data within one data structure for different measuring ranges of a sensor according to the specific embodiments of the present invention.

FIG. 1 shows a sequential data structure 10 of size j bit that is established for a primary measuring range A of a sensor. Sensor data are provided in this data structure 10 by the sensor.

In order to expand primary measuring range A, these sensor data are now adapted in data structure 10 in the following manner: Depending on the size of maximum measuring range $A*2^m$, which is greater than primary measuring range A, the sensor data are now arranged in an expanded data structure 20. FIG. 1 now shows different measuring ranges A, $A*2^k$, $A*2^1$, $A*2^m$ where 1<k<l<m, reference numeral 14 identifying maximum measuring range $A*2^m$ of the sensor and reference numeral 11 identifying primary measuring range A. The provided sensor data of the sensor are now filled with additional values at beginning 20a or at end 20b according to the particular measuring range 11, 12, 13, 14 to form expanded data structure 20, the latter having a size j+m bit overall independent of the measuring range, i.e., overall size j+m bit corresponds here to maximum measuring range $A*2^m$ 14 of the sensor. If measuring range 12, 13 is now between primary measuring range 11 and maximum measuring range 14, the sections of expanded data structure 20, which are now additionally available and to be filled, are accordingly filled with value "0" at beginning 20a and at end 20b. Here, primary measuring range 11 is also adapted in that m values "0" are added at beginning 20a. In the case of inertial sensors, whose sensor data are generally signed, the so-called most significant bit (MSB) of the sensor data is added instead of one of the values "0."

Starting from this measuring range 11, the number of the filled values is then accordingly reduced at beginning 20a toward greater measuring ranges 12, 13, 14 and these values are accordingly added at end 20b of expanded data structure 20.

In detail, m values having value "0" are thus added at beginning 20a for primary measuring range 11 in expanded data structure 20. In the case of greater measuring ranges 12, 13, 14, m–k values "0" are filled at beginning 20a and k values "0" are filled at end 20b. In the case of measuring range 12, m–l values "0" are filled at beginning 20a and l values "0" are filled at end 20b. If the measuring range is expanded to maximum measuring range 14, m values "0" are added only at end 20b. Ultimately, an expanded data structure 20 of size j+m bit is then provided. In other words, if the sensor provides the data in a section A having the accuracy of j bit, for example, and it is also able to provide data in sections $A*2^k$, $A*2^1$ and $A*2^m$, where 1<k<l<m applies, then the data format has at least bit width j+m. In section A, the lowest j bits would carry pieces of information and the rest is filled with the MSB value, in the case that the data are signed or are filled with "0" for data without signs. In section $A*2^k$, the lowest k bits are filled with "0" or those bits that have increased accuracy, and next j bits are filled with the data value, etc. Moreover, random values may be used completely or partially instead of values "0."

Figure 2:
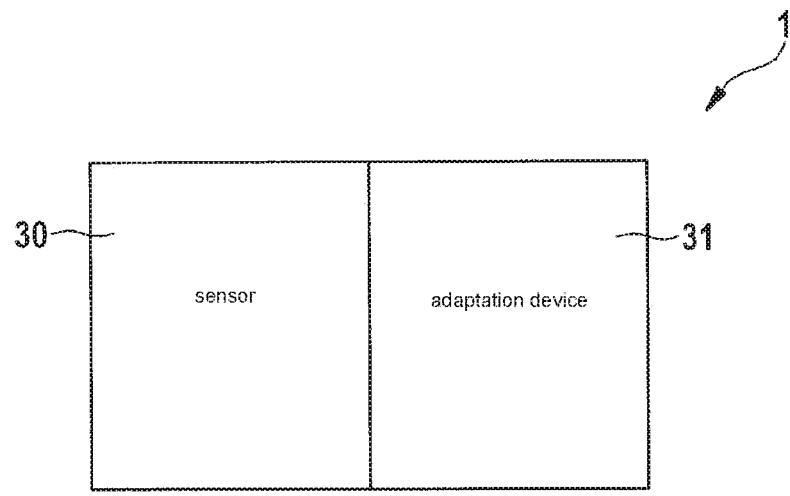
FIG. 2 schematically shows a sensor system according to one specific example embodiment of the present invention.

FIG. 2 schematically shows a sensor system according to one specific embodiment of the present invention.

FIG. 2 shows a sensor system 1, including a sensor 30, which correspondingly provides sensor data in data structure 10, and an adaptation device 31 for outputting the adapted data according to data structure 20 as described in FIG. 1.

Figure 3:
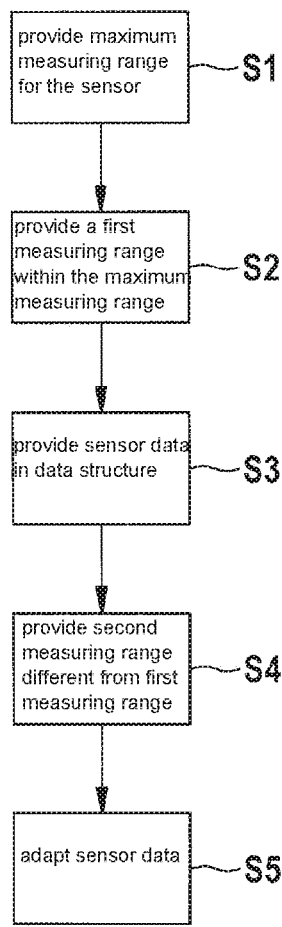
FIG. 3 schematically shows the steps of a method for providing sensor data according to one specific embodiment of the present invention.

FIG. 3 shows the steps of a method for providing sensor data according to one specific embodiment of the present invention.

FIG. 3 shows the steps of a method for providing the sensor data of a sensor.

In a first step S1, providing a maximum measuring range for the sensor takes place.

In a second step S2, providing a first measuring range for the sensor, which is within the maximum measuring range, further takes place.

In a third step S3, providing the sensor data in a data structure, the data structure having a size that corresponds to the first measuring range, further takes place.

In a fourth step S4, providing a second measuring range for the sensor, which is different from the first measuring range and is within the maximum measuring range, further takes place.

In a fifth step S5, adapting the provided sensor data of the first measuring range for the second measuring range further takes place in such a way that the adapted sensor data are provided in an expanded data structure, the expanded data structure having a size that corresponds to the maximum measuring range, and the provided sensor data being arranged as a function of the difference of the size between the maximum and the second measuring range and the size of the second measuring range within the expanded data structure, and the sensor-data-free sections being filled with values.

Figure 4:
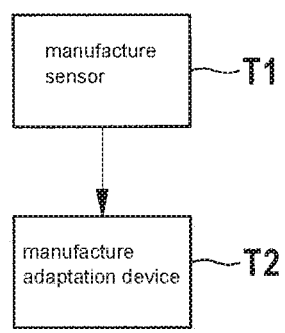
FIG. 4 schematically shows the steps of a method for manufacturing a sensor system according to one specific embodiment of the present invention.

FIG. 4 shows the steps of a method for manufacturing a sensor system according to one specific embodiment of the present invention.

FIG. 4 shows the steps of a method for manufacturing a sensor system.

In a first step T1, manufacturing of a sensor having a first measuring range that is within the maximum measuring range takes place, the sensor being designed to provide sensor data in a data structure, the data structure having a size that corresponds to the first measuring range.

In a second step T2, manufacturing of an adaptation device for adapting the provided sensor data of the first measuring range for a second measuring range, which is different from the first measuring range and is within the maximum measuring range, further takes place in such a way that the adapted sensor data are provided in an expanded data structure, the expanded data structure having a size that corresponds to the maximum measuring range, and the provided sensor data being arranged as a function of the difference of the size between the maximum and the second measuring range and the size of the second measuring range within the expanded data structure, and the sensor-data-free sections being filled with values.

To sum up, at least one of the specific example embodiments of the present invention has at least one of the following advantages:

Reduction of the storage need in the internal memory of the sensor/sensor system.

Post-processing of the sensor data according to the adjusted measuring range no longer necessary.

The data format does not depend on the measuring range.

Although the present invention has been described on the basis of preferred exemplary embodiments, it is not limited thereto, but may be modified in multiple ways.

What is claimed is:

1. A method for providing sensor data of a sensor, comprising the following steps:
   providing a maximum measuring range for the sensor;
   providing a first measuring range for the sensor, which is within the maximum measuring range;
   providing the sensor data of the first measuring range in a data structure, the data structure having a size that corresponds to the first measuring range;
   providing a second measuring range for the sensor, which is different from the first measuring range and is within the maximum measuring range; and
   adapting the provided sensor data of the first measuring range for the second measuring range in such a way that the adapted sensor data are provided in an expanded data structure, the expanded data structure having a size that corresponds to the maximum measuring range, and the provided sensor data being arranged as a function of a difference of a size between the maximum measuring range and the second measuring range and a size of the second measuring range within the expanded data structure, and sensor-data-free sections of the expanded data structure being filled with values,
   wherein the expanded data structure is a one-dimensional data structure, and wherein the provided sensor data are sequentially stored in the expanded data structure one after another in such a way that the sensor-data-free sections are arranged at a beginning of the expanded data structure and/or at an end of the expanded data structure.

2. The method as recited in claim 1, wherein a size of the sensor-data-free section is reduced at the beginning of the expanded data structure in the case of a greater measuring range, starting from the first measuring range, and a size of the sensor-data-free section at the end of the expanded data structure is increased according to the size of the reduction.

3. The method as recited in claim 1, wherein the predefined values are provided as signs and/or as a value "0".

4. The method as recited in claim 1, wherein the values are random data.

5. The method as recited in claim 1, wherein the expanded data structure is provided with an MSB 0 bit numbering.

6. A sensor system having a maximum measuring range, comprising:
   a sensor having a first measuring range, which is within the maximum measuring range, wherein the sensor is configured to provide sensor data in a data structure, the data structure having a size that corresponds to the first measuring range; and
   an adapter configured to adapt the provided sensor data of the first measuring range for a second measuring range, which is different from the first measuring range. and is within the maximum measuring range, in such a way that the adapted sensor data are provided in an expanded data structure, the expanded data structure having a size that corresponds to the maximum measuring range, and the provided sensor data being arranged as a function of s difference of a size between the maximum measuring range and the second measuring range and a size of the second measuring range within the expanded data structure, and sensor-data-free sections being filled with values,
   wherein the expanded data structure is a one-dimensional data structure, and wherein the provided sensor data are sequentially stored in the expanded data structure one after another in such a way that the sensor-data-free sections are arranged at a beginning of the expanded data structure and/or at an end of the expanded data structure.

7. The sensor system as recited in claim 6, wherein the adapter includes a microcontroller.

8. The sensor system as recited in claim 6, wherein the sensor and the adapter form a structural unit.

9. The sensor system as recited in claim 6, wherein the sensor and the adapter are structurally separate, but connected to one another, via a wireless connection.

10. A method for manufacturing a sensor system, comprising the following steps:

manufacturing a sensor having a first measuring range that is within a maximum measuring range of the sensor system, the sensor being configured to provide sensor data in a data structure, the data structure having a size that corresponds to the first measuring range; and manufacturing an adapter configured to adapt the provided sensor data of the first measuring range for a second measuring range, which is different from the first measuring range and is within the maximum measuring range, in such a way that the adapted sensor data are provided in an expanded data structure, the expanded data structure having a size that corresponds to the maximum measuring range, and the provided sensor data being arranged as a function of a difference of a size between the maximum measuring range and the second measuring range and a size of the second measuring range within the expanded data structure, and sensor-data-free sections being filled with values, wherein the expanded data structure is a one-dimensional data structure, and wherein the provided sensor data are sequentially stored in the expanded data structure one after another in such a way that the sensor-data-free sections are arranged at a beginning of the expanded data structure and/or at an end of the expanded data structure.

\* \* \* \* \*